United States Patent [19]
Redford

[11] Patent Number: 5,763,112
[45] Date of Patent: *Jun. 9, 1998

[54] METHOD AND STRUCTURE FOR ATTACHING A BATTERY TO AN ELECTRICAL DEVICE

[75] Inventor: Peter M. Redford, San Jose, Calif.

[73] Assignee: TV Interactive Data Corporation, San Jose, Calif.

[*] Notice: The term of this patent shall not extend beyond the expiration date of Pat. No. 5,569,549.

[21] Appl. No.: 692,994

[22] Filed: Aug. 6, 1996

Related U.S. Application Data

[63] Continuation of Ser. No. 405,645, Mar. 17, 1995, Pat. No. 5,569,549.

[51] Int. Cl.⁶ .................................................. H01M 2/20
[52] U.S. Cl. .................. 429/1; 429/10; 429/121; 429/123; 29/623.1
[58] Field of Search .................. 429/1, 10, 121, 429/123, 122, 96, 178; 29/623.1; 439/371

[56] References Cited

U.S. PATENT DOCUMENTS

| | | |
|---|---|---|
| 3,132,204 | 5/1964 | Giellerup. |
| 3,475,213 | 10/1969 | Stow. |
| 4,427,481 | 1/1984 | Smith et al. ........... 156/306.6 |
| 5,116,700 | 5/1992 | Takeda ................... 429/121 |

OTHER PUBLICATIONS

"Scotch Conductive Adhesive Transfer Tape No. 9702", Product Information Page, Scotch 3M, Jul. 1988.

*Primary Examiner*—Anthony Skapars
*Attorney, Agent, or Firm*—Skjerven, Morrill, MacPherson, Franklin & Friel LLP; Alan H. MacPherson; Omkar K. Suryadevara

[57] ABSTRACT

In accordance with this invention, a novel stick-on peel-off fastener, comprising one or more conductive sticky elements, sandwiched between one or more terminals of a first object such as an electrical device and one or more terminals of a second object such as battery, can keep the battery affixed to the electrical device while the battery supplies power to the electrical device. One embodiment of a conductive sticky element includes a layer of conductive adhesive, such as a polymer resin that has a number of microscopic silver filings. Another embodiment of a conductive sticky element includes a number of hooks, such as those in Velcro™ elements. Yet another embodiment of a conductive sticky element includes a magnet that when used with another magnet, prevents improper coupling of the two objects due to magnetic repulsion.

39 Claims, 9 Drawing Sheets

METHOD AND STRUCTURE FOR ATTACHING A BATTERY TO AN ELECTRICAL DEVICE

This application is a continuation of application Ser. No. 08/405,645, filed Mar. 17, 1995, now U.S. Pat. No. 5,569,549.

FIELD OF THE INVENTION

This invention relates to a fastener for detachably attaching and electrically coupling a battery to an electrical device.

BACKGROUND INFORMATION

A conventional electrical device 100 (FIG. 1A) such as a remote control typically includes a portion, such as a battery cover 101 that can be removed from another portion, such as housing 111 to allow access to an enclosure 102 (FIG. 1B) typically formed by five interior surfaces 103–107 (FIG. 1B) of housing 111. Positive terminal 108 and negative terminal 109 of the circuitry (not shown) of device 100 are located inside enclosure 102, supported by interior surfaces 103 and 105. Terminals 108 and 109 are typically formed as springs (or are spring loaded) to replaceably hold batteries 110 and 120 (FIG. 1C) within enclosure 102. When cover 101 is closed (FIG. 1A), various components, such as terminals 108 and 109, located within enclosure 102 are inaccessible from a region exterior to electrical device 100, unless cover 101 is removed.

However, some electrical devices, such as electronic greeting cards, do not have such an enclosure. Even in devices with such an enclosure, repeated battery replacements can cause plastic deformation of spring loaded terminals which may no longer form a reliable contact with inserted batteries. Also, removing a cover of a battery enclosure is cumbersome, and a non-trivial task for a child, such as a two year old. Moreover, removing batteries installed between spring loaded terminals can pose a significant challenge to a two year old.

SUMMARY

In accordance with this invention, a novel stick-on peel-off fastener includes one or more conductive sticky elements that simultaneously (1) detachably attach and (2) electrically couple terminals of a first object, such as a battery to corresponding terminals of a second object such as an electrical device, so that the battery can be affixed to the electrical device while supplying power. In two variations of this embodiment, the conductive sticky element is permanently attached to the terminals of one of the objects: (1) a battery or (2) an electrical device and detachably attached to the other object. In a third variation of this embodiment, two conductive sticky elements are permanently attached to a battery and an electrical device and the elements are detachably attached to each other.

One embodiment of a conductive sticky element is an adhesive element that includes a layer of conductive adhesive, such as a polymer resin that has a number of microscopic conductive filings (e.g. of silver or iron) and has mechanical properties similar to the adhesive used in a mailing label, such as a Tyvex™ label. In this embodiment, the amount of force needed to stick on a battery to an electrical device using the conductive sticky element is minimal, for example, just touching the battery to the electrical device is sufficient because the element is sticky. Also in this embodiment, the amount of force needed to peel off the battery from the electrical device is significant, for example, three pounds. When not in use, a backing can be detachably attached to the conductive adhesive to prevent inadvertent attachments to an unselected object.

Another embodiment of a conductive sticky element is a hooks and loops element, such as a conductive Velcro™ element. In one variation of this embodiment, a terminal of an electrical device is permanently attached to a hooks and loops element that can detachably attach and electrically couple to another hooks and loops element permanently attached to a corresponding electrode of a battery.

Another embodiment of a conductive sticky element is a magnetic element that includes a magnetic dipole. In one embodiment, a first magnetic element is permanently attached to a terminal of an electrical device and a second magnetic element is permanently attached to a terminal of a battery such that the first magnetic element and the second magnetic element avoid contacting each other by magnetic repulsion when the electrical device's terminal and the battery's terminal do not correspond to each other, e.g. when the battery's terminal is a positive terminal and the device's terminal is a negative terminal. In a variation of this embodiment, the first magnetic element is also an adhesive element, e.g. the magnet is formed by magnetizing the microscopic conductive filings of the conductive adhesive.

The use of a stick-on peel-off fastener to simultaneously detachably attach and electrically couple a battery to an electrical device has several advantages over the prior art. When used in accordance with this invention, the battery can be elegantly and simply peeled off from the electrical device. After such removal, another battery can be just as easily attached. Furthermore, in an apparatus in accordance with this invention, the contacts between battery terminals and electrical device terminals have low resistances because typically the stick-on peel-off fastener has large contact areas as compared to, for example, the thickness of a wire. Such contacts are also less noisy and more reliable than battery contacts of the prior art.

Moreover, an electrical device's terminals can be located on an exterior surface, thereby eliminating the need for a battery enclosure and reducing the size and cost of an electrical device in accordance with this invention, as compared to a prior art device. Location of terminals on the exterior surface also allows the electrical device to be hermetically sealed, without need to break the seal to replace batteries, which prevents exposure of delicate internal components of an electrical device to contamination by, for example, dust or accidental touching that can happen for example during the replacement of batteries inside a prior art wrist watch.

Also, electrical devices in accordance with this invention can be built without a battery enclosure, in a substantially flat form, for use as, for example, a wrist watch, a CD-ROM case, or an interactive magazine. Moreover, use of magnetic repulsion can eliminate improper coupling of two objects and allow even a child to replace a battery in accordance with this invention.

DETAILED DESCRIPTION

Figure 1C:
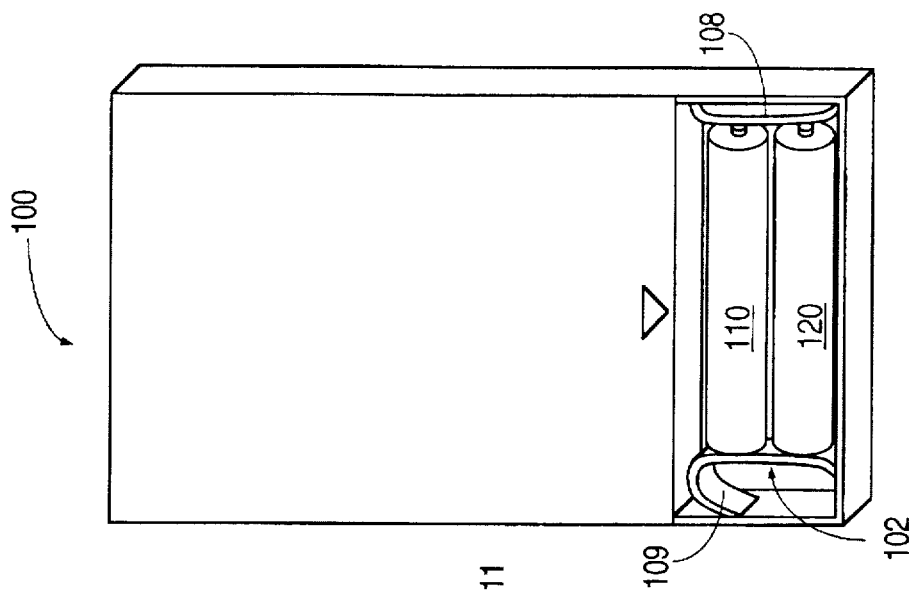
FIGS. 1A–1C illustrate in perspective view the installation of batteries in a conventional electrical device.
Figure 1B:
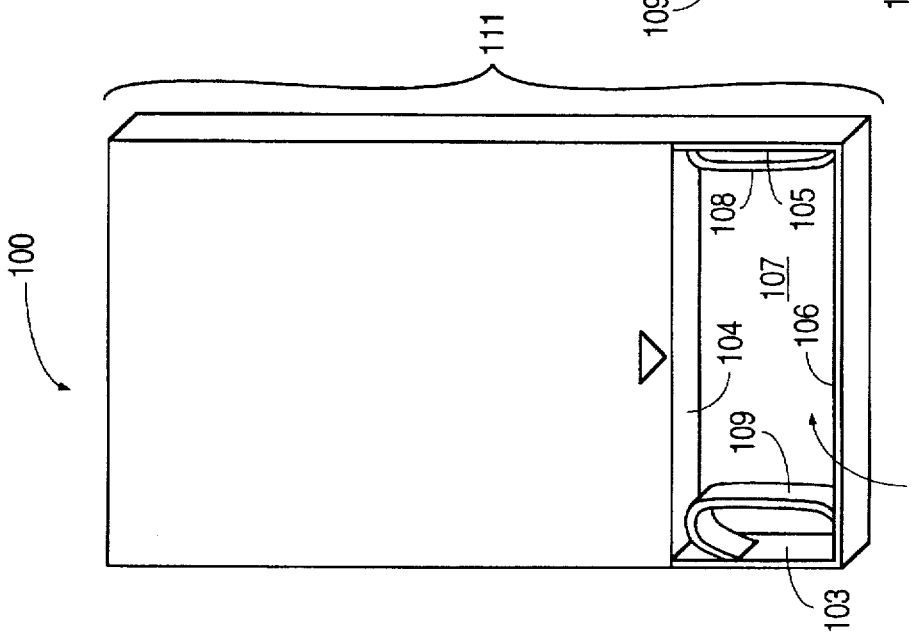
Figure 1A:
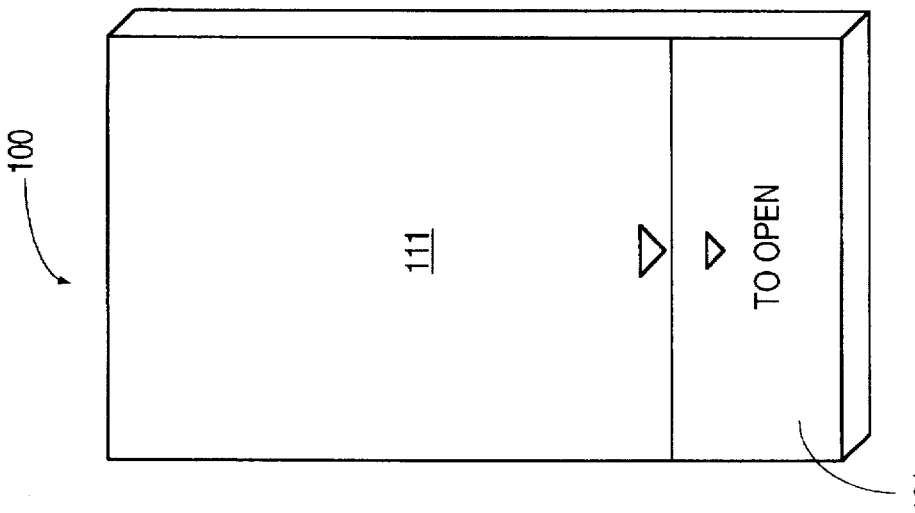
Figures 2A, 2B:
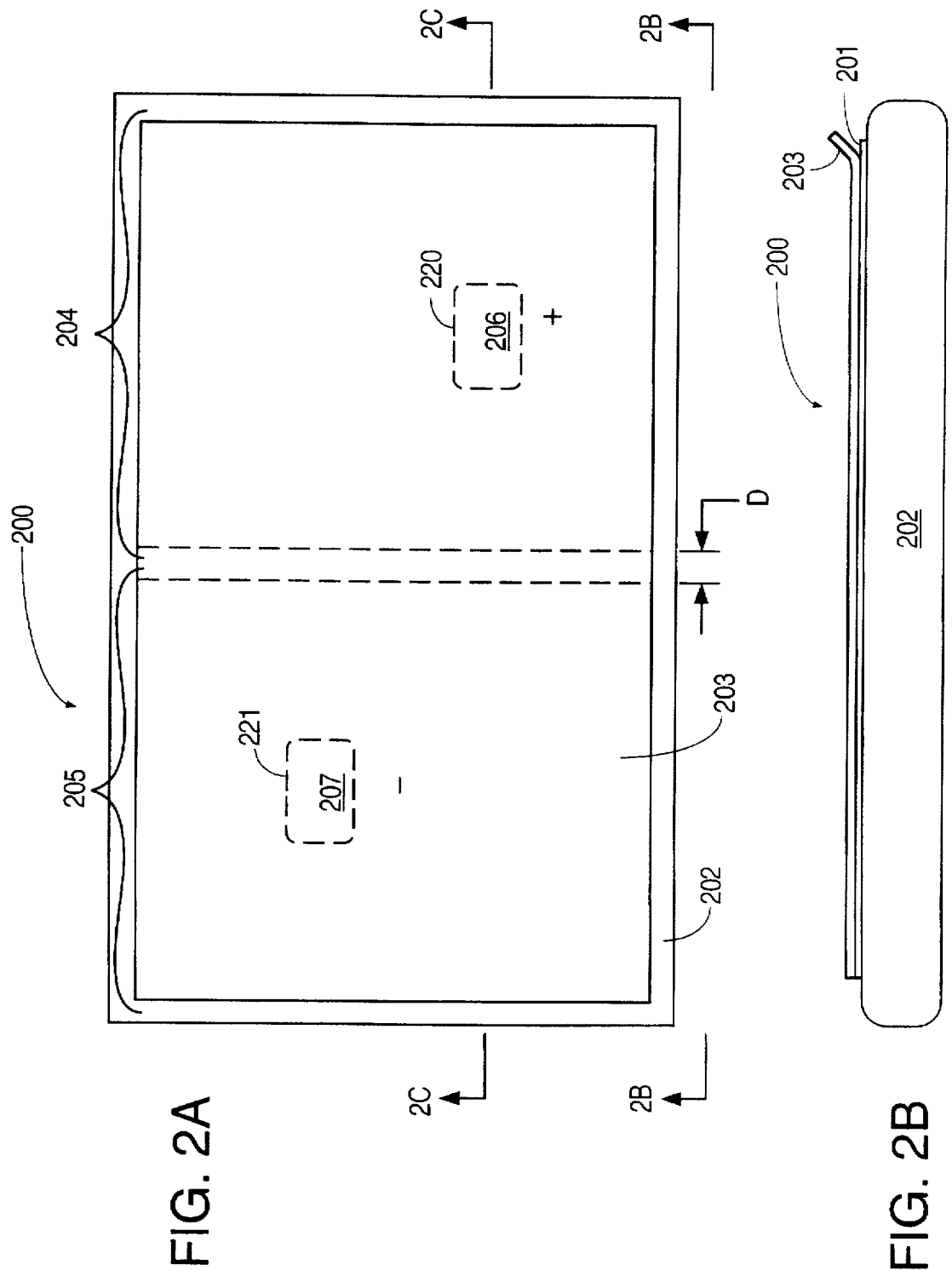
FIGS. 2A, 2B and 2C illustrate in plan elevation and cross-sectional views respectively, conductive sticky elements that include a layer of conductive adhesive in accordance with this invention.
Figure 2C:
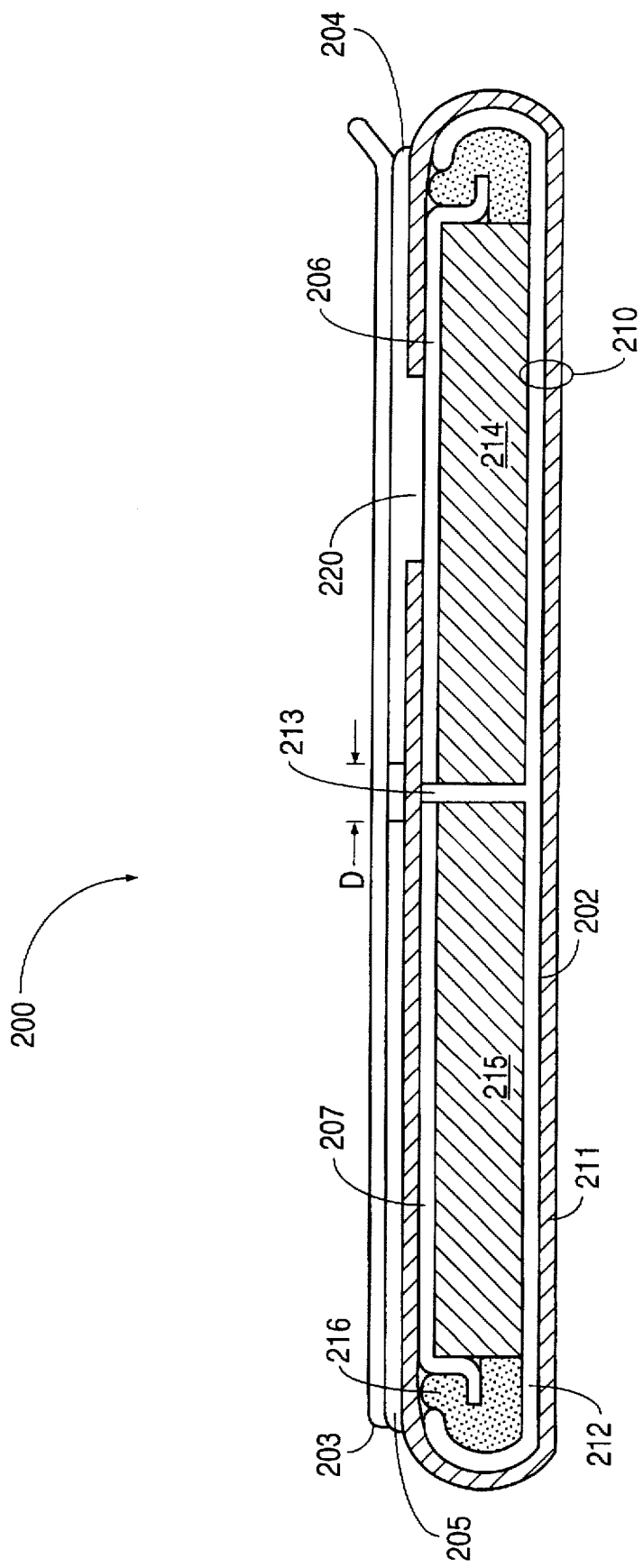
Figure 2F:
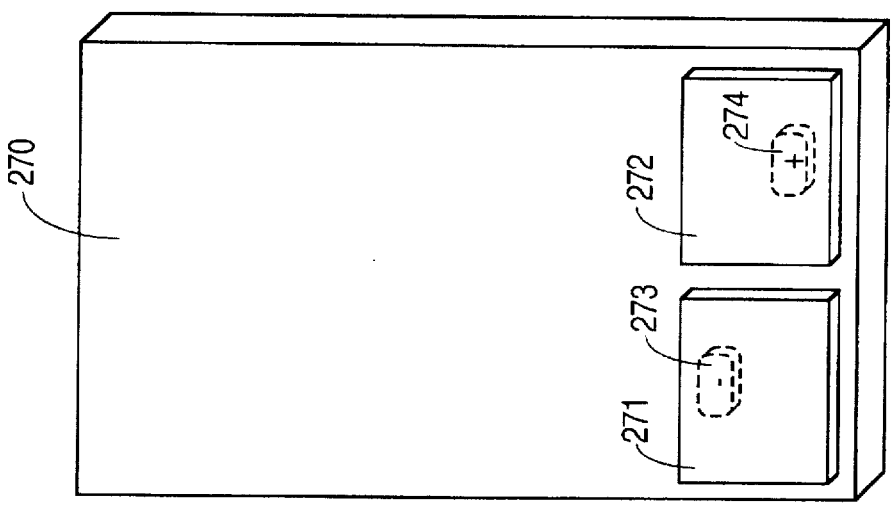
FIGS. 2D, 2E and 2F illustrate in perspective views a novel electrical device and a combination thereof with the battery of FIGS. 2A–2C.
Figure 2E:
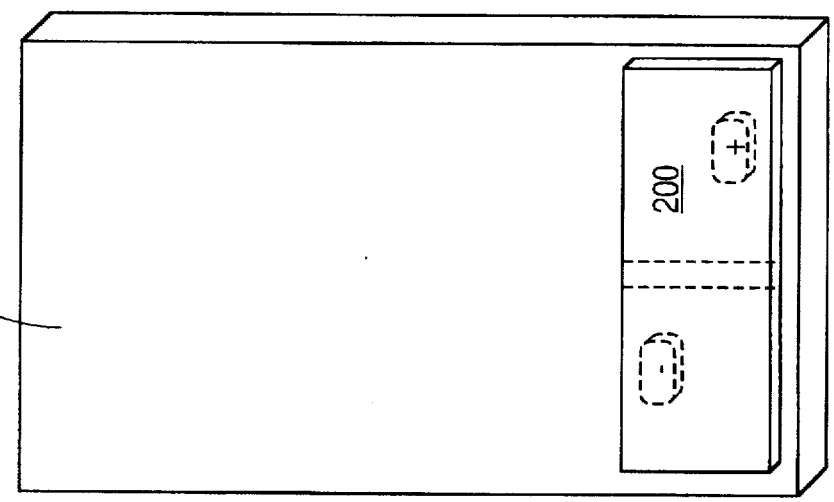
Figure 2D:
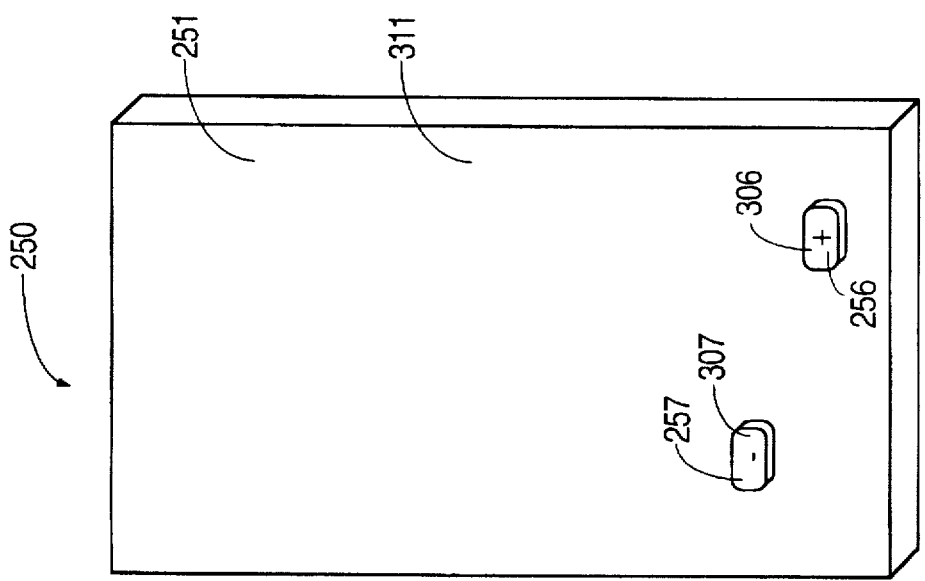

One embodiment of this invention is an object 200 (FIGS. 2A and 2B) that has a stick-on peel-off fastener 201 (FIG. 2B) that includes, for example, an adhesive for detachably attaching object 200 to an electrical device 250 (FIGS. 2D and 2E). In the embodiment illustrated in FIGS. 2A and 2B, stick-on peel-off fastener 201 is sandwiched between a battery 202 and a backing 203. Backing 203 is detachably attached to stick-on peel-off fastener 201, whereas battery 202 is permanently attached to stick-on peel-off fastener 201.

Backing 203 is peeled off prior to the detachable attachment of object 200 to electrical device 300.

In the embodiment illustrated in FIGS. 2A and 2B, stick-on peel-off fastener 201 includes two conductive sticky elements 204 and 205, each having a layer of conductive adhesive that is directly resident on a positive electrode 206 and a negative electrode 207 respectively of battery 202. Conductive sticky elements 204 and 205 are separated from each other by a separation distance D, for example, 0.1 inch. Separation distance D insulates elements 204 and 205 from each other.

Figure 5A:
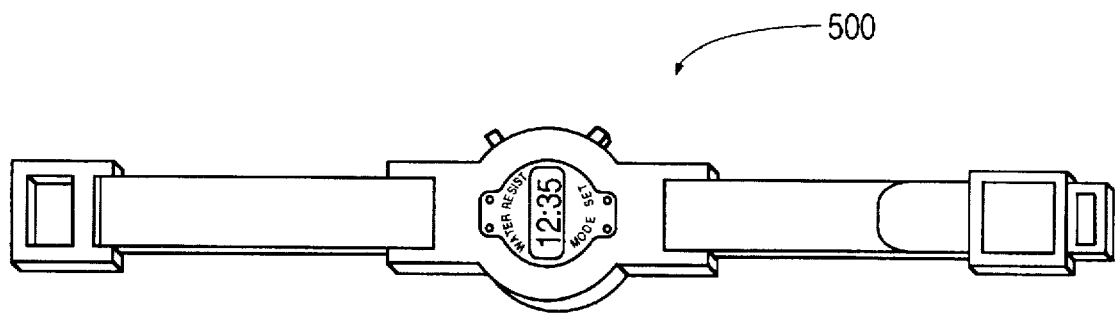
FIGS. 5A and 5B illustrate top and bottom plan views of a wrist watch that uses a stick-on peel-off fastener.
Figure 5B:
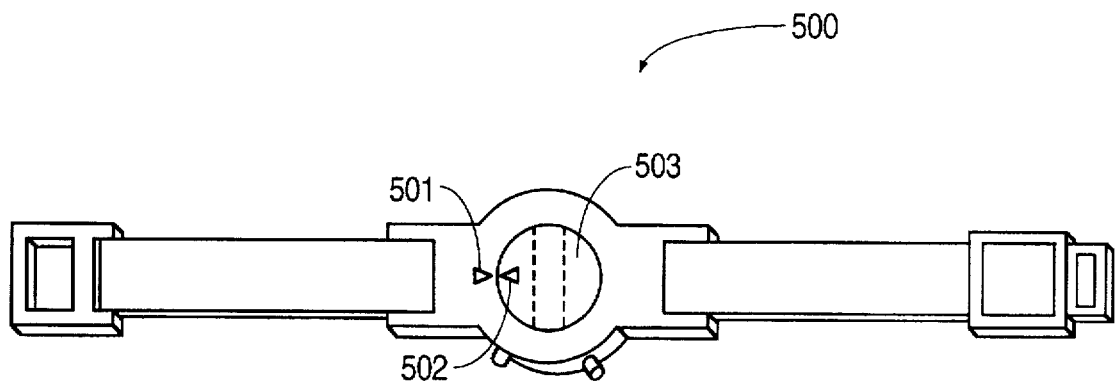

Although one embodiment of an object 200 is illustrated in FIGS. 2A and 2B, the specific configuration of stick-on peel-off fastener 201 and battery 202 is not critical for practicing this invention. For example, elements 204 and 205 can be formed in a variety of shapes, such as semicircular (FIGS. 5A and 5B). Moreover, distance D can be chosen to be of any magnitude with respect to the dimensions of elements 204 and 205, depending on the needs of a specific application. For example, to eliminate the possibility of an accidental discharge of battery 202 by an improper placement that couples elements 204 and 205 to each other via a terminal of an electrical device, separation distance D can be made larger than the largest dimension (such as a diameter) of the electrical device's terminal.

Moreover, battery 202 can have a wide variety of sizes, shapes and internal configurations. Battery 202 can be single cell or a combination of several cells in any series-parallel combination. The cells can either be primary cells that are to be discharged only once and discarded, or secondary cells that can be recharged. The cells can be either wet cells or dry cells. Cells in accordance with this invention also include solar cells and thermal cells.

Battery 202 can be, for example, a 3A1400 battery available from Gould, Inc. Materials and Components Business Section, 35129 Curtis Boulevard, Eastlake, OH 44095-4001, 1-800-468-5310.

In one specific embodiment, battery 202 (FIG. 2C) has a housing 210 that includes a jacket 211 that encloses the various components of battery 202, including a separator 212. Separator 212 has a separator wall 213 that insulates a positive active material 214 from a negative active material 215. Positive active material 214 can be, for example, manganese oxide $MnO_2$, whereas negative active material 215 can be, for example, lithium Li. Battery 202 includes a grommet 216 that holds each of electrodes (also called "terminals") 206 and 207 in contact with active materials 214 and 215 respectively.

Jacket 211 defines two holes 220 (FIG. 2C) and 221 (FIG. 2A) that allow access to electrodes 206 and 207 respectively. To form object 200 from battery 202, a layer of conductive adhesive is applied to each of electrodes 206 and 207 in holes 220 and 221 to form elements 204 and 205.

The conductive adhesive can be any adhesive that is sticky at room temperature, for example, a polymer resin and includes a number of microscopic conductive filings of e.g. silver or iron. The loading (e.g. percentage by volume) of the conductive particles is sufficiently large (e.g. over 50% volume) to ensure at least one conductive path through the conductive sticky element. Conductive adhesive can be, for example, product "UVC8201" available from Acheson Colloids Company, 1600 Washington Avenue, Port Huron, Mich. 48061. The use of conductive adhesive eliminates the need for a soldering iron that was used in the prior art to couple for example, objects such as an integrated circuit and a printed circuit board.

Backing 203 can be applied over adhesive layers 204 and 205 for protection prior to use with electrical device 250 (FIG. 2D).

Electrical device 250 is similar to a prior art electrical device, except that there is no battery enclosure and instead positive terminal 256 and negative terminal 257 are accessible from, (e.g. protrude out of) an external surface of housing 251.

Electrical device 250 is hermetically sealed, eliminating access to any interior region of electrical device 250. To use electrical device 250, a user peels off backing 203 and contacts elements 204 and 205 to the region surrounding terminals 256 and 257 (FIG. 2D), as illustrated by their combination in FIG. 2E. As each of elements 204 and 205 covers a large area compared to the dimensions of terminals 256 and 257, there is no need to precisely align terminals 256 and 257 with holes 220 and 221 because elements 204 and 205 electrically connect terminals 256 and 257 to the respective electrodes 206 and 207.

In one embodiment, the conductive adhesive of elements 204 and 205 has mechanical properties similar to the adhesive used in a mailing label, such as a Tyvex™ mailing label. The amount of force needed to stick on object 200 is minimal, for example, just touching elements 204 and 205 to housing 311 is adequate. Elements 204 and 205 keep object 200 affixed to electrical device 250, while battery 202 supplies power to electrical device 250 through elements 204 and 205. Whenever necessary, a user can simply peel off object 200 from electrical device 250 due to the detachable attachment by elements 204 and 205.

Another embodiment of an object in accordance with this invention is an electrical device 270 (FIG. 2F) that is similar to electrical device 250 (FIG. 2D) except that electrical device 270 includes conductive sticky elements 271 and 272 that are permanently attached and electrically coupled to electrical terminals 273 and 274 of device 270. In this embodiment, electrical device 270 can be used with a conventional battery such as a 3A1400 battery referenced above. Electrical device 270 can also be used with object 200 described above. In this embodiment, conductive sticky elements 271 and 272 include layers of conductive adhesive of the type described above.

In another embodiment a first object 300 (FIG. 3A) such as a battery is similar to object 200 (FIG. 2C) except for the following differences. Instead of conductive sticky elements being layers of conductive adhesive, the conductive sticky elements are hooks and loops elements 304 and 305 that have hooks or loops or both hooks and loops formed of a conductive material. Elements 304 and 305 can be, for example, conductive velcro™ elements available from Velcro USA, 406 Brown Avenue, Manchester, NH, Phone: 1-800-225-0180. Hooks and loops elements 304 and 305 are permanently mounted on terminal 307 and housing 310 by a conductive adhesive, such as product "ML25184" available from Acheson Colloids Company (above) that hardens after application.

To use first object 300, a second object 350 such as an electrical device includes matching elements such as hooks and loops elements 354 and 355 that have hooks or loops also formed of a conductive material and that are connected to a positive terminal 356 and a negative terminal 357 respectively of second object 350.

Hooks and loops elements have the advantage of infinite life as compared to a conductive adhesive that must be designed to have a life at least as large as the shelf life of, for example, the cells in battery 202. In contrast to hooks and loops elements, a conductive adhesive layer is less expensive, can be, made much thinner and does not require a matching element.

Battery 302 in object 300 does not have a jacket, and instead housing 310 is in contact with positive active material 314 and forms a positive electrode. Battery 302 also includes a separator 312 that separates negative active material 315 from positive active material 314. A current collector 317 transfers electrons from negative active material 315 to a negative electrode 307.

Figure 3A:
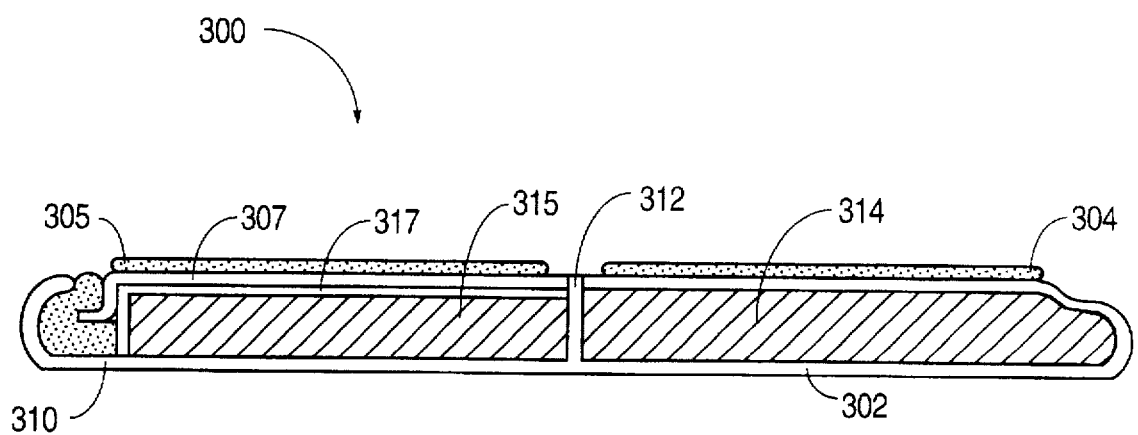
FIGS. 3A–3C illustrate in a cross-sectional and perspective views the use of a conductive sticky element including a number of hooks and/or loops in a battery, an electrical device, and their combination thereof.
Figures 3B, 3C:
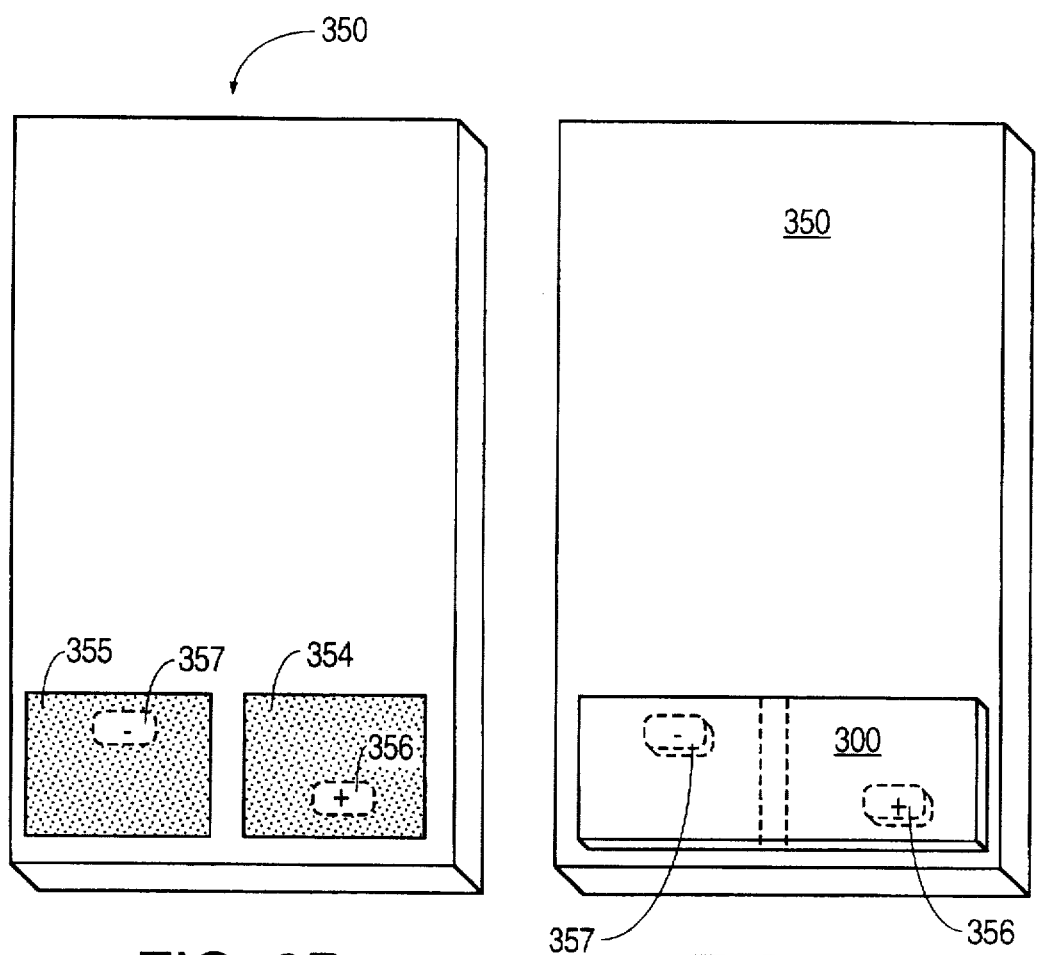
Figure 4A:
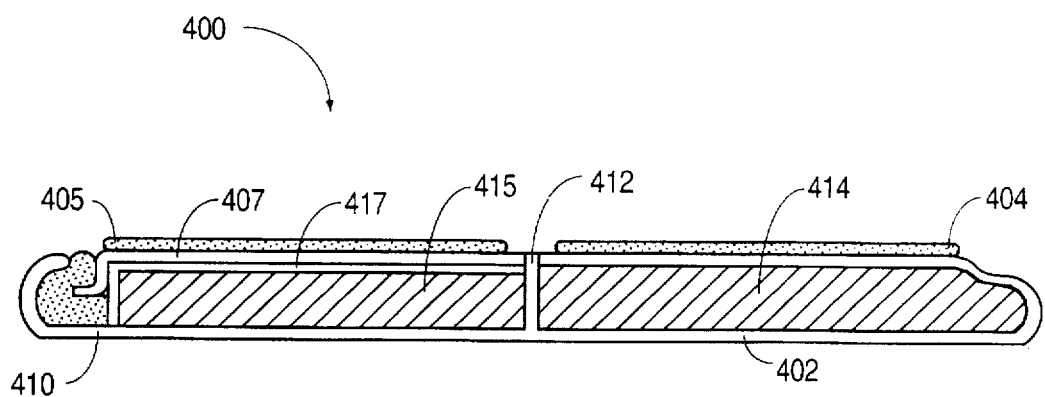
FIGS. 4A–4C illustrate in a cross-sectional and two perspective views the use of a conductive sticky element including a magnet, a battery, an electrical device, and their combination thereof.
Figures 4B, 4C:
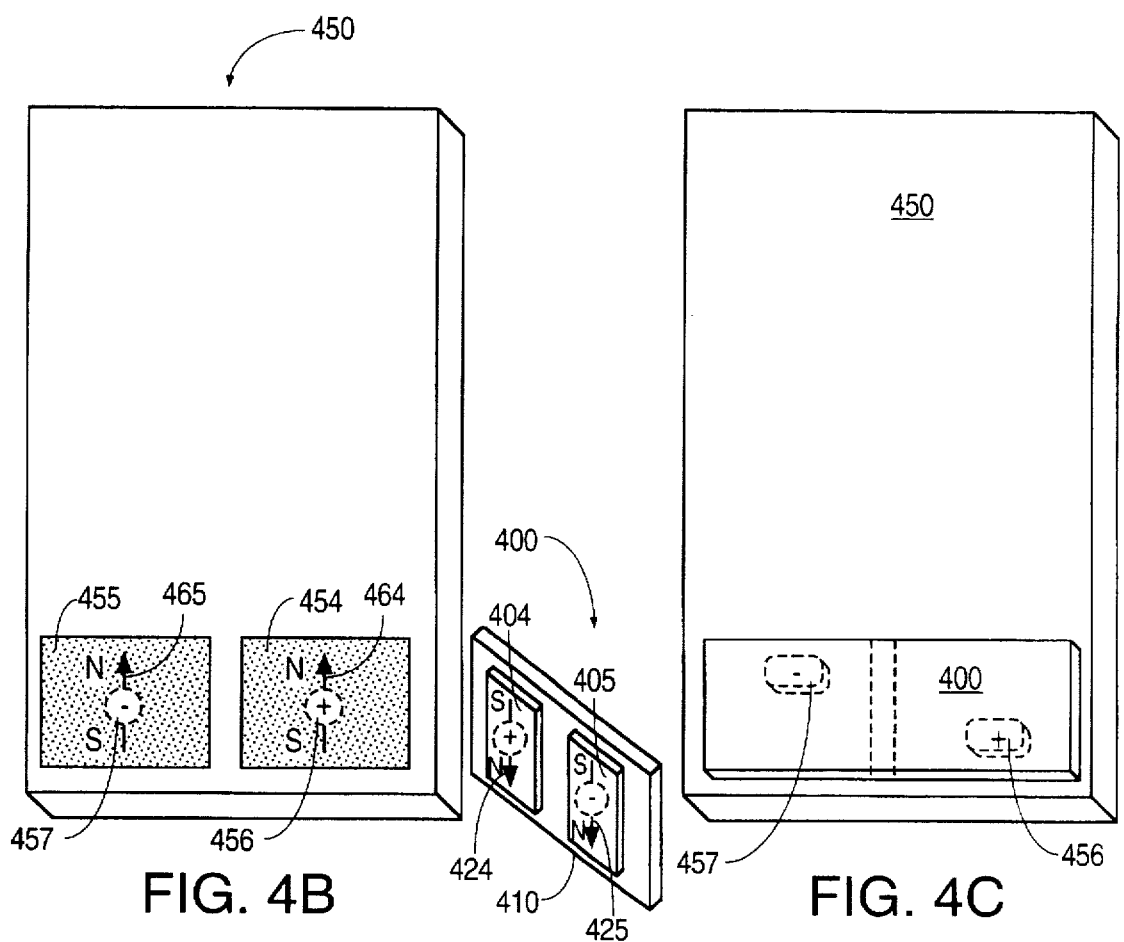

In another embodiment, a first object 400 (FIG. 4A) such as a battery, is similar to object 300 (FIG. 3A) and many of the reference numerals in FIGS. 4A–4C are derived from the reference numerals of corresponding components in FIGS. 3A–3C by adding 100. Instead of hooks and loops elements 304 and 305, the conductive sticky elements are magnetic elements 404 and 405 that have a magnetic material commercially available, for example, from Dexter Magnetic Material, 1159 Sonora Court, Sunnyvale, CA 94086. The magnetic material can have domains that are sufficiently aligned to produce, for example, magnetic dipoles 424 and 425 that consist of magnetic poles of opposite signs N and S (FIG. 4B). In this embodiment, second object 450 also has conductive sticky elements in the form of magnetic elements 454 and 455 that are permanently mounted and electrically connected to terminals 456 and 457 respectively and that are also formed of a magnetic material of the type described above. Magnetic dipoles 464 and 465 of magnetic elements 454 and 455 are aligned in a direction opposite to the direction of magnetic dipoles 424 and 425 so that magnetic elements 404 and 405 experience a torque T (FIG. 4B) due to the magnetic attraction between dipoles 464 and 424 and dipoles 465 and 425 respectively.

Such an attraction facilitates proper attachment of first object 400 to second object 450 (FIG. 4C) so that the corresponding terminals are electrically coupled. In this embodiment, the orientation of the dipoles in the magnetic elements eliminates inadvertent coupling of the non corresponding terminals, for example, by coupling of element 454 to element 405 (FIG. 4B), because in such a case, magnetic dipoles 464 and 425 repel each other. Therefore, even a two year old can replace the batteries of an electrical device, in accordance with this invention.

The strength of magnetic dipoles 464, 465, 424 and 425 is selected to be sufficiently small so that the Lorentz force on a charge moving through magnetic elements 404, 405, 454 and 455 is sufficiently small to permit transfer of the majority (greater than 50%) of the energy from battery 402 to a circuit (not shown) in object 450. The forces on a charge moving through a magnetic field are well known, for example, see "Solutions Of Maxwell's Equations In Free Spaces", Chapter 20, The Feynman Lectures on Physics, Addison Wesley Publishing Company, Reading, Mass. 1964.

Magnetic dipoles 425, 424, 464 and 465 can be formed in one embodiment by magnetizing conductive particles embedded in an adhesive of the type described above in reference to FIGS. 2C and 2D.

Although magnetic dipoles aligned in opposite directions are used in the embodiment described above in reference to FIGS. 4A–4C, in other embodiments, first object 400 can be coupled to any conventional electrical device and second object 450 can be coupled to any conventional battery.

In another embodiment, electrical device 500 (FIGS. 5A and 5B) is a wrist watch. Wrist watch 500 has a mark 501 that is aligned with another mark 502 on an object 503 (FIG. 5A) in the form of a battery for proper coupling of terminals. Instead of a wrist watch, electrical device 500 can be a different object, such as a bracelet with light emitting diodes.

Figure 6:
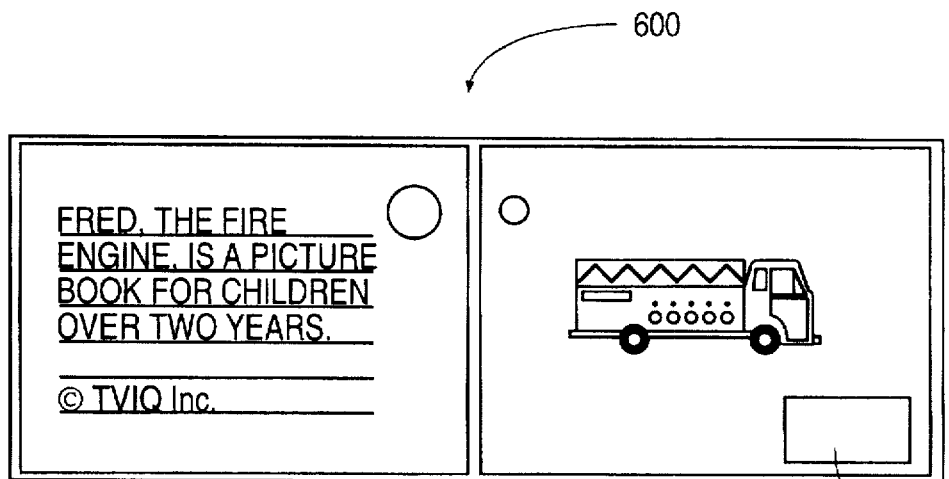
FIG. 6 illustrates in perspective view an interactive book that uses the stick-on peel-off fastener.
Figure 7:
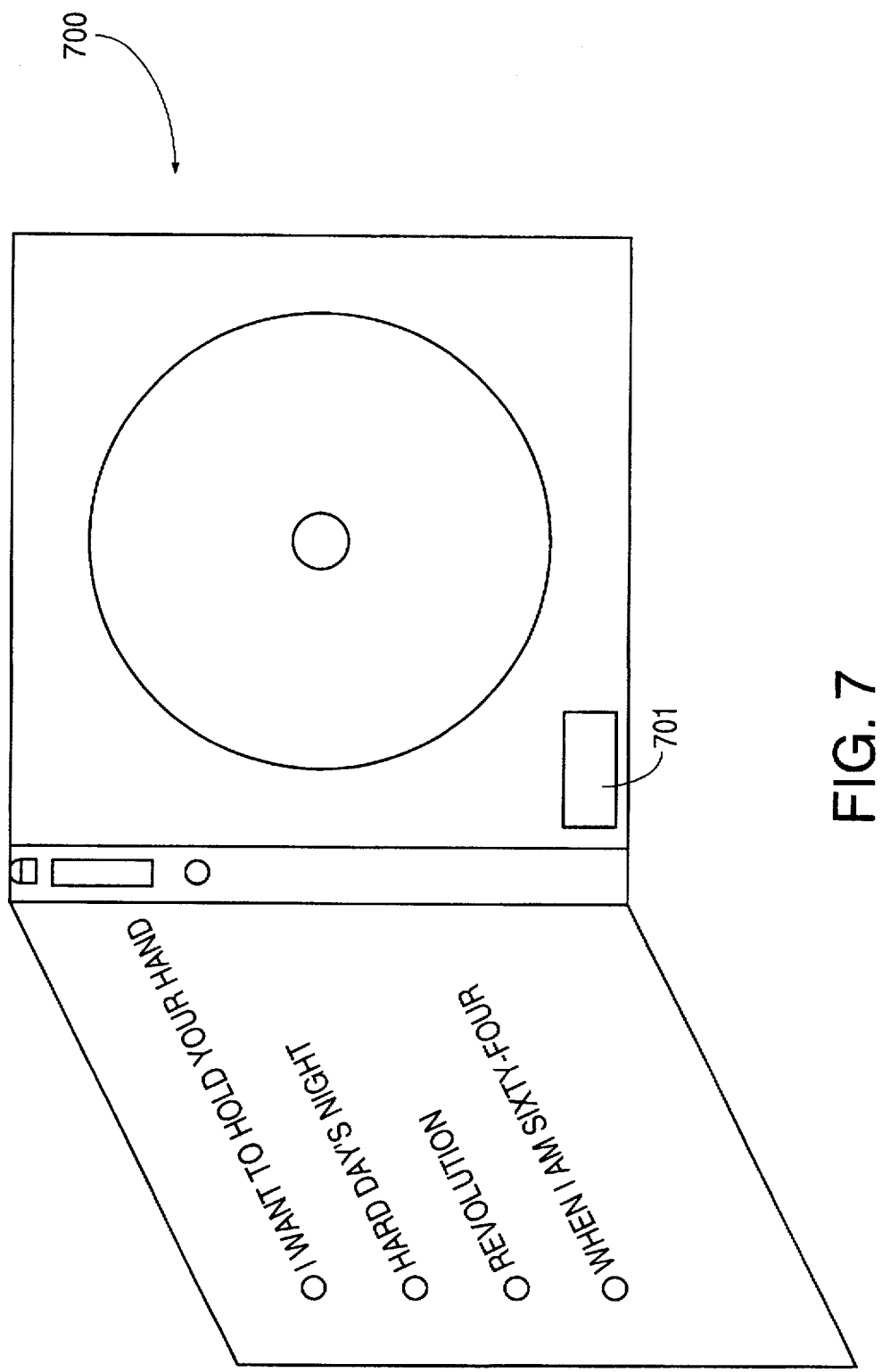
FIG. 7 illustrates a compact disk that uses a stick-on peel-off fastener.
Figure 8:
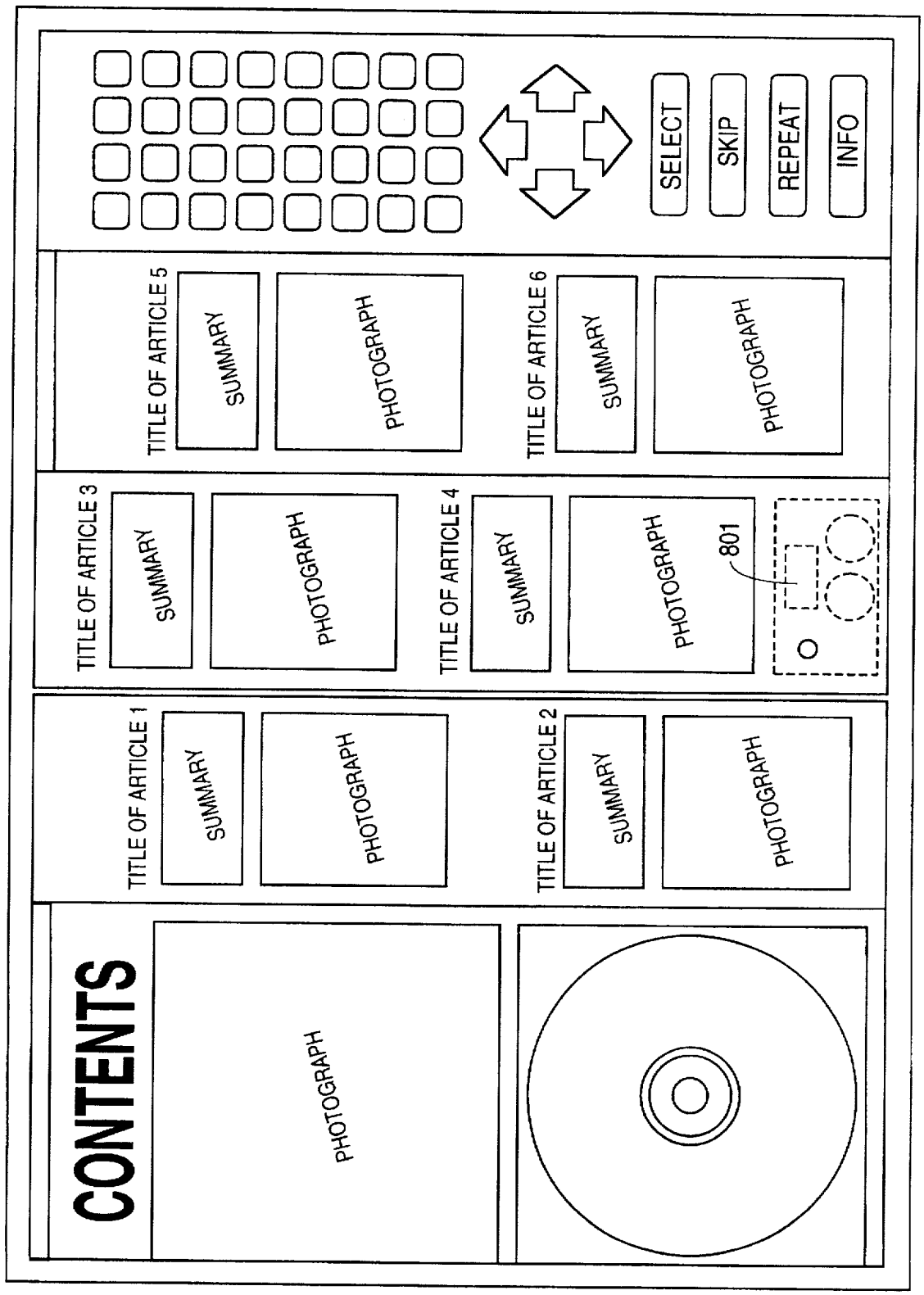
FIG. 8 illustrates an interactive magazine that uses a stick-on peel-off fastener.

In other embodiments, an electrical device is an interactive book 600 (FIG. 6), a compact disk case 700 (FIG. 7) and an interactive magazine 800 (FIG. 8) of the type described in U.S. Patent application Ser. No. 08/269,492, filed Jul. 1, 1994 by Peter M. Redford and Donald S. Stern that is incorporated by reference herein in its entirety. Each of electrical devices 600, 700 and 800 is attached to and powered by a battery 601, 701 and 801 respectively that has a conductive sticky element as described above. In one embodiment, each of batteries 601, 701 and 801 carries an advertisement of a product other than a battery, e.g. a soft drink advertisement of Coca Cola™.

Numerous modifications and adaptations of the embodiments described herein are encompassed within the broad scope of this invention. For example, the use of hooks and loops elements formed of a conductive material is not limited to coupling batteries to electrical devices, and can be used, for example, to detachably attach and electrically couple a first object, such as a light bulb, to a second object, such as a lamp's socket.

Various modifications and adaptations are encompassed by the attached claims.

I claim:
1. An electrical device comprising:
   a circuit having a first terminal and a second terminal, a terminal selected from the group consisting of said first terminal and said second terminal being capable of receiving electrons; and
   a conductive sticky element having a first side and a second side opposite said first side, said first side being permanently attached to said first terminal, said second side being detachably couplable to a battery or another electrical device, said conductive sticky element being electrically conductive from said first side to said second side.

2. The electrical device of claim 1 wherein said conductive sticky element comprises a layer of conductive adhesive.

3. The electrical device of claim 1 further comprising a backing detachably attached to said conductive sticky element, wherein said backing is peeled-off from said conductive sticky element prior to detachable attachment between said electrical device and a battery.

4. The electrical device of claim 1 wherein said first terminal and said second terminal are located adjacent each other in a planar region of said electrical device.

5. The electrical device of claim 1 wherein said conductive sticky element comprises a plurality of hooks.

6. The electrical device of claim 1 wherein at least a portion of said conductive sticky element is resident on said first terminal.

7. The electrical device of claim 1 wherein said conductive sticky element comprises a magnet.

8. The electrical device of claim 1 wherein said terminal and said second terminal are located on an exterior surface of said electrical device, said exterior surface being accessible from a region exterior to said electrical device.

9. The electrical device of claim 1 wherein said electrical device is substantially flat and devoid of a battery enclosure.

10. The electrical device of claim 1 wherein said electrical device is selected from a group consisting of a wrist watch, a CD-ROM case and an interactive magazine.

11. The electrical device of claim 1 wherein:
said electrical device is hermetically sealed to eliminate access to any region interior to said electrical device;
said first terminal and said second terminal are located on an exterior surface of said electrical device; and
said electrical device is devoid of a battery enclosure.

12. A method comprising:
permanently attaching a first side of a conductive sticky element on a terminal of an electrical device; and
detachably attaching a second side of said conductive sticky element to a terminal of a battery, said detachable attaching forming an electrical coupling between said terminals.

13. The method of claim 12 wherein said battery supplies an electric current to said electrical device through said conductive sticky element.

14. The method of claim 12 further comprising detaching said battery from said electrical device and detachably attaching said electrical device to another battery.

15. An electrical apparatus comprising:
a battery having a first terminal and a second terminal, said battery further having a first mark;
an electrical device having a first terminal for connection to said first terminal of said battery and a second terminal for connection to said second terminal of said battery said electrical device having a second mark, said second mark being aligned with said first mark when said first terminal of said electrical device is aligned to said first terminal of said battery; and
a fastener comprising:
a first conductive sticky element sandwiched between said first terminals, said first conductive sticky element being permanently attached to one terminal of said first terminals and detachably attached to the other terminal of said first terminals, said first conductive sticky element electrically coupling said first terminals.

16. The electrical apparatus of claim 15 wherein said fastener further comprises a second conductive sticky element sandwiched between said second terminals, said second conductive sticky element being permanently attached to one of said second terminals, said second conductive sticky element being detachably attached to the other of said second terminals.

17. The electrical apparatus of claim 15 wherein said first conductive sticky element comprises a layer of conductive adhesive.

18. The electrical apparatus of claim 15 wherein said first conductive sticky element comprises a plurality of hooks.

19. The electrical apparatus of claim 15 wherein said first conductive sticky element comprises a magnet.

20. The electrical apparatus of claim 15 wherein said first terminal and said second terminal of said electrical device are located on an exterior surface of said electrical device, said exterior surface being accessible from a region exterior to said electrical device.

21. The electrical apparatus of claim 15 wherein said electrical device is hermetically sealed.

22. The electrical apparatus of claim 15 wherein said electrical device is substantially flat and devoid of a battery enclosure.

23. The electrical apparatus of claim 15 wherein said electrical device is a device selected from the group comprising a wrist watch, a CD-ROM case and an interactive magazine.

24. The electrical apparatus of claim 15 further comprising a second conductive sticky element sandwiched between said first terminals, said second conductive sticky element being permanently attached to the other terminal of said first terminals, said second conductive sticky element being detachably attached to said first conductive sticky element.

25. The electrical apparatus of claim 24 wherein said first conductive sticky element and said second conductive sticky element are magnetized such that said battery and said electrical device repel each other when a first terminal is adjacent to a second terminal.

26. A battery comprising:
a battery cell comprising a first terminal and a second terminal, one of said first terminal and said second terminal being capable of supplying electrons said battery cell having a mark for alignment with another mark on an electrical device; and
a conductive sticky element permanently attached to said first terminal.

27. The battery of claim 26 wherein said conductive sticky element comprises a layer of conductive adhesive.

28. The battery of claim 27 further comprising a backing detachably attached to said conductive sticky element, wherein said backing is peeled-off from said conductive sticky element prior to detachable attachment between an electrical device and said battery.

29. The battery of claim 26 wherein said first terminal comprises a conductive housing of said battery.

30. The battery of claim 26 wherein said first terminal and said second terminal are located adjacent each other in a planar region of said battery.

31. The battery of claim 26 wherein said conductive sticky element comprises a plurality of hooks.

32. The battery of claim 26 wherein at least a portion of said conductive sticky element is resident on said first device terminal.

33. The battery of claim 26 wherein said conductive sticky element comprises a plurality of loops.

34. A method comprising:
permanently attaching a conductive sticky element on a terminal of a battery; and detachably attaching said conductive sticky element to a terminal of an electrical device so that a first mark on said battery is aligned to a second mark on said electrical device, said detachable attaching forming an electrical coupling between said terminals.

35. The method of claim 34 wherein said battery cell supplies an electric current to said electrical device through said conductive sticky element.

36. The method of claim 34 further comprising detaching said battery from said electrical device and detachably attaching said electrical device to another battery.

37. An electrical apparatus comprising:

a first object having a first electrical terminal and a second electrical terminal, said first object having a first mark;

a second object having a first electrical terminal for connection to said first electrical terminal of said first object and a second electrical terminal for connection to said second electrical terminal of said first object, said second object having a second mark, said second mark being aligned with said first mark; and a first conductive sticky element sandwiched between said first terminals, said first conductive sticky element being permanently attached to one of said first terminals, said first conductive sticky element being detachably attached to the other of said first terminals.

38. The electrical apparatus of claim 37 further comprising a second conductive sticky element sandwiched between said second electrical terminals, said second conductive sticky element being permanently attached to one of said second electrical terminals, said second conductive sticky element being detachably attached to the other of said second electrical terminals.

39. The electrical apparatus of claim 37 wherein said first conductive sticky element directly connects said first terminals to each other.

* * * * *

UNITED STATES PATENT AND TRADEMARK OFFICE
CERTIFICATE OF CORRRECTION

PATENT NO. : 5,763,112
DATED : June 9, 1998
INVENTOR(S) : Peter M. Redford It is certified that error appears in the above-identified patent and that said Letters Patent is hereby corrected as shown below:

On the title page: Item [56]

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 3 | 8 | 7 | 1 | 8 | 9 | 02/07/95 | Gory et al | | | |
| | | 5 | 3 | 8 | 0 | 2 | 7 | 1 | 01/10/95 | Gyory | | | |
| | | 5 | 5 | 5 | 8 | 6 | 7 | 9 | 09/24/96 | Tuttle | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | WO | 9 | 3 | 2 | 4 | 1 | 7 | 8 | 12/09/93 | PCT | | | | |

Signed and Sealed this

Ninth Day of November, 1999

Attest:

Q. TODD DICKINSON

*Attesting Officer*                *Acting Commissioner of Patents and Trademarks*